(12) United States Patent
Dalwani et al.

(10) Patent No.: US 12,143,401 B2
(45) Date of Patent: Nov. 12, 2024

(54) COMMUNICATIONS DEVICE CONTACTABILITY METRIC

(71) Applicant: Prove Identity, Inc., New York, NY (US)

(72) Inventors: Manish Dalwani, Westminster, CO (US); Christopher Cunningham, Highlands Ranch, CO (US); Yekaterina Bardash, Denver, CO (US); Greg Bonin, Denver, CO (US)

(73) Assignee: Prove Identity, Inc., New York, NY (US)

( * ) Notice: Subject to any disclaimer, the term of this patent is extended or adjusted under 35 U.S.C. 154(b) by 334 days.

(21) Appl. No.: 17/690,935

(22) Filed: Mar. 9, 2022

(65) Prior Publication Data

US 2023/0291750 A1    Sep. 14, 2023

(51) Int. Cl.
*H04L 9/40* (2022.01)
*H04W 8/20* (2009.01)

(52) U.S. Cl.
CPC .............. *H04L 63/14* (2013.01); *H04W 8/20* (2013.01)

(58) Field of Classification Search
CPC ...... H04L 63/14; H04L 63/1408; H04W 4/70; H04W 4/80; H04W 88/02; H04W 4/029; H04W 4/38; H04W 8/20
See application file for complete search history.

(56) References Cited

U.S. PATENT DOCUMENTS 7,181,197 B2    2/2007  Clayton
7,221,749 B2    5/2007  Chiczewski
(Continued)

FOREIGN PATENT DOCUMENTS

EP    2490128 A1    8/2012
EP    3043575 A1    7/2016
(Continued)

OTHER PUBLICATIONS

U.S. Appl. No. 17/372,493 / Response to Non-Final Office Action filed Feb. 21, 2023, 18 pages, Doc 1896.
U.S. Appl. No. 17/372,493 / Final Office Action dated Mar. 29, 2023, 22 pages, Doc 1895.
U.S. Appl. No. 17/081,685 / Non-final Office Action dated May 3, 2022, 48 pages, Doc 1897.
U.S. Appl. No. 17/539,810 / Corrected Notice of Allowability dated Feb. 15, 2023, 6 pages, Doc 1898.
U.S. Appl. No. 17/539,810 / Issue Fee Payment and Comments on Reasons for Allowance filed Apr. 24, 2023, 9 pages, Doc 1900.
(Continued)

*Primary Examiner* — Rasha S Al Aubaidi
(74) *Attorney, Agent, or Firm* — Husch Blackwell LLP; Bryan D. Stewart; Matthew Francis

(57) ABSTRACT

Briefly, example methods, apparatuses, and/or articles of manufacture may be implemented to authenticate a communications device via a communications network. One embodiment may include obtaining, via a communications network coupled to a client computing resource, signals indicative of the subscriber identifier. The signals indicative of the subscriber identifier may facilitate computing a contactability metric of a communications device corresponding to the subscriber identifier, wherein the contactability metric is to relate to a likelihood that the communications device can be electronically contacted within a predetermined interval, the contactability metric being computed responsive to obtaining signals from one or more databases accessible to an authenticator, the obtained signals being indicative of an outcome of one or more events, such as determining a type of the communications device, as well as records pertaining to a number of additional signals indicating events that relate to activities of a communications device.

29 Claims, 5 Drawing Sheets

(56) References Cited

U.S. PATENT DOCUMENTS

| | | | |
|---|---|---|---|
| 10,878,414 | B2 | 12/2020 | Pillai et al. |
| 11,223,943 | B2 | 1/2022 | Desai |
| 2008/0141037 | A1 | 6/2008 | Cheston et al. |
| 2008/0261561 | A1 | 10/2008 | Gehrmann |
| 2010/0100939 | A1 | 4/2010 | Mahaffey |
| 2011/0019811 | A1 | 1/2011 | May |
| 2011/0151843 | A1 | 6/2011 | Deuel |
| 2012/0115545 | A1 | 5/2012 | Middleton |
| 2012/0303455 | A1 | 11/2012 | Busch |
| 2013/0003958 | A1 | 1/2013 | Brown |
| 2013/0024375 | A1 | 1/2013 | Choudhuri |
| 2014/0164178 | A1 | 6/2014 | Adjaoute |
| 2014/0199962 | A1 | 7/2014 | Mohammed |
| 2014/0247144 | A1 | 9/2014 | Proud |
| 2015/0026027 | A1 | 1/2015 | Priess et al. |
| 2015/0033337 | A1 | 1/2015 | Baikalov |
| 2015/0039513 | A1 | 2/2015 | Adjaoute |
| 2015/0178715 | A1 | 6/2015 | Buhrmann |
| 2015/0230088 | A1 | 8/2015 | Barkan |
| 2015/0269578 | A1 | 9/2015 | Subramanian |
| 2017/0053107 | A1 | 2/2017 | Nahari |
| 2017/0103388 | A1 | 4/2017 | Pillai et al. |
| 2017/0289796 | A1 | 10/2017 | Raleigh |
| 2017/0300881 | A1 | 10/2017 | Weinflash et al. |
| 2018/0212971 | A1 | 7/2018 | Costa |
| 2019/0347431 | A1 | 11/2019 | Nair |
| 2020/0059860 | A1 | 2/2020 | Huang |
| 2020/0104876 | A1 | 4/2020 | Chintakindi |
| 2020/0260258 | A1 | 8/2020 | Desai |
| 2021/0150523 | A1 | 5/2021 | Pillai et al. |
| 2022/0012743 | A1 | 1/2022 | Snell |
| 2022/0129900 | A1 | 4/2022 | Naujok |
| 2022/0159449 | A1 | 5/2022 | Desai |
| 2022/0174478 | A1 | 6/2022 | Naujok |

FOREIGN PATENT DOCUMENTS

| | | |
|---|---|---|
| EP | 3487154 A1 | 5/2019 |
| WO | WO2020167977 | 8/2020 |
| WO | WO2022015611 | 1/2022 |

OTHER PUBLICATIONS

PCT/US2023/014842 / PCT Application filed Mar. 9, 2023, 66 pages, Doc 1899.
U.S. Appl. No. 17/372,493 / AFCP Request & Response to Final Office Action filed May 30, 2023, 26 pages, Doc 1919.
U.S. Appl. No. 17/372,493 / Advisory Action dated Jun. 9, 2023, 4 pages, Doc 1920.
U.S. Appl. No. 17/372,493 / RCE & Amendment filed Jun. 29, 2023, 31 pages, Doc 1921.
U.S. Appl. No. 17/372,493 / Non-Final Office Action dated Jul. 12, 2023, 13 pages, Doc 1922.
U.S. Appl. No. 17/081,685 / Response to Non-final Office Action dated Jul. 12, 2023, 24 pages, Doc 1923.
BR Application No. 1120230080452 / Brazil Application filed Apr. 27, 2023, 38 pages, Doc 1924.
CA Application No. 3,196.741 / Canada Application filed Apr. 26, 2023, 17 pages, Doc 1925.
EP Application No. 21887366.9 / European Application filed Apr. 27, 2023, 6 pages, Doc 1926.
EP Application No. 21887366.9 / Rule 161-162 Communication received dated Jun. 6, 2023, 3 pages, Doc 1927.
EP Application No. 21887366.9 / Notice of Publication dated Aug. 9, 2023, 1 page, Doc 1928.
IN Application No. 202347030304 / India Application filed Apr. 27, 2023, 68 pages, Doc 1929.
IN Application No. 202347030304 / Application Filing Receipt dated Apr. 27, 2023, 1 page, Doc 1930.
IN Application No. 202347030304 / Publication Notice dated Jun. 28, 2023, 2 pages, Doc 1931.
U.S. Appl. No. 17/539,810 / Issue Notification dated May 17, 2023, 2 pages, Doc 1932.
PCT/US2023/014842 / International Search Report and Written Opinion dated Jul. 7, 2023, 12 pages, Doc 1933.
U.S. Appl. No. 17/109,038 / Notice of Allowance / Allowability dated Jun. 15, 2022, 17 pages, Doc 1841.
U.S. Appl. No. 17/081,685 / Response to Non-final Office Action dated Jun. 22, 2022, 18 pages, Doc 1840.
U.S. Appl. No. 17/081,685 / Final Office Action dated Sep. 12, 2022, 43 pages, Doc 1842.
U.S. Appl. No. 17/372,493 / Patent Application filed Jul. 11, 2021, 98 pages, Doc 1753.
U.S. Appl. No. 17/372,493 / Filing Receipt dated Jul. 27, 2021, 3 pages, Doc 1754.
U.S. Appl. No. 17/372,493 / Notice of Publication dated Jan. 13, 2022, 1 page, Doc 1755.
PCT/US2021/041205 / PCT Application filed Jul. 11, 2021, 93 pages, Doc 1756.
PCT/US2021/041205 / Invitation to Correct Defects dated Jul. 28, 2021, 2 pages, Doc 1757.
PCT/US2021/041205 / Response to Invitation to Correct Defects filed Sep. 14, 2021, 4 pages, Doc 1758.
PCT/US2021/041205 / International Search Report and Written Opinion dated Oct. 20, 2021, 9 pages, Doc 1759.
PCT/US2021/041205 / Article 34 Amendment and Chapter II Demand filed May 5, 2022, 18 pages, Doc 1761.
U.S. Appl. No. 17/081,685 / Patent Application filed Oct. 27, 2020, 72 pages, Doc 1762.
U.S. Appl. No. 17/081,685 / Filing Receipt dated Nov. 6, 2020, 4 pages, Doc 1763.
U.S. Appl. No. 17/081,685 / Corrected Filing Receipt dated Mar. 28, 2022, 4 pages, Doc 1764.
U.S. Appl. No. 17/081,685 / Non-final Office Action dated May 3, 2022, 30 pages, Doc 1765.
PCT/US2021/056699 / PCT Application filed Oct. 26, 2021, 72 pages, Doc 1766.
PCT/US2021/056699 / Invitation to Correct Defects in the International Application dated Nov. 16, 2021, 2 pages, Doc 1767.
PCT/US2021/056699 / Response to Invitation to Correct Defects in the International Application filed Jan. 13, 2022, 2 pages, Doc 1768.
PCT/US2021/056699 / Intl Search Report and Written Opinion dated Jan. 28, 2022, 66 pages, Doc 1769.
U.S. Appl. No. 16/789,199 / Patent Application filed Feb. 12, 2020, 48 pages, Doc 1770.
U.S. Appl. No. 16/789,199 / Filing Receipt and Notice to File Corrected Application Papers dated Mar. 3, 2020, 6 pages, Doc 1771.
U.S. Appl. No. 16/789,199 / Respose to Notice to File Corrected Application Papers dated Mar. 23, 2020, 11 pages, Doc 1772.
U.S. Appl. No. 16/789,199 / Updated Filing Receipt dated Mar. 26, 2020, 4 pages, Doc 1773.
U.S. Appl. No. 16/789,199 / Notice of Publication dated Aug. 14, 2020, 1 page, Doc 1774.
U.S. Appl. No. 16/789,199 / Non-final Office Action dated May 12, 2021, 18 pages, Doc 1775.
U.S. Appl. No. 16/789,199 / Amendment filed Aug. 12, 2021, 14 pages, Doc 1776.
U.S. Appl. No. 16/789,199 / Notice of Allowance / Allowability dated Sep. 1, 2021, 10 pages, Doc 1777.
U.S. Appl. No. 16/789,199 / Issue Fee Payment and Comments on Reasons for Allowance filed Dec. 1, 2021, 12 pages, Doc 1778.
U.S. Appl. No. 16/789,199 / 312 Amendment filed Dec. 1, 2021, 9 pages, Doc 1779.
U.S. Appl. No. 16/789,199 / Corrected Notice of Allowability and Examiner Response to 312 Amendment dated Dec. 14, 2021, 4 pages, Doc 1780.
U.S. Appl. No. 16/789,199 / Issue Notification dated Dec. 21, 2021, 1 page, Doc 1781.
U.S. Appl. No. 17/539,810 / Patent Application filed Dec. 1, 2021, 67 pages, Doc 1782.
U.S. Appl. No. 17/539,810 / Filing Receipt and Notice to File Corrected Application Papers dated Dec. 14, 2021, 6 pages, Doc 1783.

(56) References Cited

OTHER PUBLICATIONS

U.S. Appl. No. 17/539,810 / Response to Notice to File Corrected Application Papers filed Jan. 28, 2022, 9 pages, Doc 1784.
U.S. Appl. No. 17/539,810 / Response to Notice of Incomplete Reply filed Feb. 3, 2022, 11 pages, Doc 1785.
U.S. Appl. No. 17/539,810 / Updated Filing Receipt dated Feb. 8, 2022, 4 pages, Doc 1786.
U.S. Appl. No. 17/539,810 / Notice of Publication dated May 19, 2022, 1 page, Doc 1787.
PCT/US2020/017966 / PCT Application filed Feb. 12, 2020, 51 pages, Doc 1789.
PCT/US2020/017966 / International Search Report and Written Opinion dated Jun. 25, 2020, 18 pages, Doc 1790.
PCT/US2020/017966 / Article 34 Amendment and Chapter II Demand filed Oct. 23, 2020, 20 pages, Doc 1791.
PCT/US2020/017966 / International Preliminary Report on Patentability dated Feb. 17, 2021, 20 pages, Doc 1792.
CA3,130,202 / CA National Phase Application filed Aug. 12, 2021, 41 pages, Doc 1801.
U.S. Appl. No. 17/109,038 / Patent Application filed Dec. 1, 2020, 54 pages, Doc 1793.
U.S. Appl. No. 17/109,038 / Filing Receipt dated Dec. 11, 2020, pages, Doc 1794.
U.S. Appl. No. 17/109,038 / Non-final Office Action dated Feb. 16, 2022, 19 pages, Doc 1795.
U.S. Appl. No. 17/109,038 / Amendment filed May 6, 2022, 15 pages, Doc 1796.
U.S. Appl. No. 17/109,038 / Notice of Publication dated Jun. 2, 2022, 1 page, Doc 1797.
PCT/US2020/062755 / PCT Application filed Dec. 1, 2020: PCT Application filed Dec. 1, 2020, 55 pages, Doc 1798.
PCT/US2020/062755 / PCT Application filed Dec. 1, 2020: International Search Report and Written Opinion dated Feb. 19, 2021, 12 pages, Doc 1799.
U.S. Appl. No. 17/372,493 / Non-final Office Action dated Nov. 18, 2022, 20 pages, Doc 1861.
U.S. Appl. No. 17/081,685 / Response to Final Office Action & AFCPR dated Nov. 23, 2022, 21 pages, Doc 1862.
U.S. Appl. No. 17/539,810 / Non-final Office Action dated Sep. 28, 2022, 16 pages, Doc 1853.
U.S. Appl. No. 17/109,038 / Issue Fee Payment and Response filed Sep. 12, 2022, 9 pages, Doc 1859.
U.S. Appl. No. 17/109,038 / Issue Notification, dated Oct. 5, 2022, 1 page, Doc 1860.
U.S. Appl. No. 17/081,685 / Advisory Action dated Dec. 9, 2022, 16 pages, Doc 1881.
U.S. Appl. No. 17/081,685 / RCE & Response to Advisory Action filed Jan. 6, 2023, 24 pages, Doc 1882.
U.S. Appl. No. 17/539,810 / Terminal Disclaimer and Response to Non-Final Office Action filed Dec. 28, 2022, 18 pages, Doc 1873.
U.S. Appl. No. 17/539,810 / Notice of Allowance and Allowability dated Jan. 25, 2023, 13 pages, Doc 1883.

COMMUNICATIONS DEVICE CONTACTABILITY METRIC

BACKGROUND

1. Field

The present disclosure relates generally to quantifying factors that determine a likelihood of whether a subscriber can be reached, such as within a predetermined timeframe via an electronic communications device, which may comprise a mobile telephone, a wireline telephone, or the like.

2. Information

The World Wide Web or simply the Web, as enabled by Internet computing, switching, wireless and wireline transmission resources, has grown rapidly in recent years at least partially in response to the relative ease with which a wide variety of electronic transactions can be performed. As a consequence of widely available Internet connections, including connections to the Internet facilitated by handheld wireless mobile communication services, for example, a mobile subscriber may shop and/or purchase virtually any product or service via a communications device. Beyond such Internet-enabled abilities to shop for products and services, a communications device may additionally be utilized to engage in financial and other types of transactions, which may include interacting with banks, brokerage houses, merchants, credit card issuers, healthcare service providers, etc. However, an unfortunate consequence of the widespread use of handheld communications devices to perform various types of transactions is that occurrences of fraud and deception have also increased in frequency.

In response to increases in occurrences of various types of fraud and deception involving use of handheld wireless communications devices, merchants, credit card issuers, healthcare providers, and other institutions typically implement fraud-detection and/or user authentication processes. Such implementations may be utilized, for example, in connection with numerous types of web-based or electronic transactions or operations. Nonetheless, although fraud detection and/or user authentication processes may reduce instances of fraud and deception involving handheld electronic communications devices, unscrupulous individuals engaging in such activities continue to increase in skill and sophistication. Thus, it may be appreciated that reduction in the instances of fraud and deception, which may involve, for example, use of various types of communications devices, continues to be an active area of investigation.

SUMMARY

One general aspect includes a method of computing a contactability metric of a subscriber identifier, including obtaining, via a communications network coupled to a client computing resource, signals indicative of the subscriber identifier, computing the contactability metric of a communications device corresponding to the subscriber identifier, the contactability metric relating to a likelihood that the communications device can be electronically contacted within a predetermined interval. The contactability metric being computed responsive to obtaining signals from one or more databases accessible to an authenticator, the obtained signals being indicative of an outcome of one or more of: determining a type of the communications device, determining a line-disconnect of the communications device, determining porting of the subscriber identifier corresponding to the communications device, determining occurrence of at least one previous interaction between the authenticator and the communications device, determining a measure of activity of the communications device, determining whether an identification of a party accompanies an outgoing communication involving the communications device, determining whether a multi-factor authentication occurred involving the communications device, and determining whether the communications device corresponds to a non-mobile device.

In particular embodiments, the method may additionally include computing a contactability metric responsive to assigning a weighting factor to at least one of the one or more signals. In particular embodiments, the weighting factor comprises either an increased value responsive to the at least one of the one or more signals indicating a relatively more recent event, or a decreased value responsive to the at least one of the one or more signals indicating a relatively less recent event. Particular embodiments may include transmitting a query to at least one database of the one or more databases, the query requesting whether any person can be expected to respond to a telephone call. Particular embodiments may include computing a contactability metric based, at least in part, on a response to the query. Particular embodiments may also include transmitting a query to the at least one database of the one or more databases, the query representing whether a predetermined individual can be expected to respond to a telephone call. A predetermined individual can be determined via accessing the at least one database comprising bureau and utility data and/or a yellowbook type database. Particular embodiments may also include computing a contactability metric based, at least in part, on a response to the query. In particular embodiments, the method may additionally include obtaining a response to the query transmitted to the database of the one or more databases, determining that the predetermined individual is not expected to respond to the telephone call, and may additionally comprise determining a parameter relating to an individual different from the predetermined individual that is expected to respond to the telephone call. In particular embodiments, the subscriber identifier may correspond to a telephone number and the method may further include detecting a linkage between two or more telephone numbers corresponding to the communications device. In particular embodiments, detecting the linkage between the one or more telephone numbers corresponds to determining a change history of a Mobile Station International Subscriber Directory Number (MSISDN) of the communications device. Particular embodiments may include computing a revised contactability metric of the communications device based, at least in part, on the linkage between the two or more telephone numbers corresponding to the communications device. Particular embodiments may additionally include computing a fresh contactability metric for a linked telephone number based, at least in part, on the linkage between the two or more telephone numbers corresponding to the communications device. Particular embodiments may include establishing a browser-based session, a session formed utilizing an application program interface (API), or a session formed utilizing a subscriber management system or database, to facilitate communications between a client computing device and the client computing resource. Particular embodiments may include receiving, via a user interface of the client computing device, the subscriber identifier. In particular embodiments, the subscriber identifier corresponds to a mobile cellular telephone number, a landline telephone number, or an identifier corresponding to a voice-over-IP (VOIP) communications device.

Another general aspect includes an apparatus to compute a contactability metric of a subscriber identifier, including a processor coupled to at least one memory device to obtain, via a communications network coupled to a client computing resource, signals indicative of the subscriber identifier. The apparatus may additionally operate to compute the contactability metric of a communications device corresponding to the subscriber identifier. The contactability metric to relate to a likelihood that the communications device can be electronically contacted within a particular interval. The contactability metric may be computed responsive to the obtained signals from one or more databases being made accessible to an authenticator, the obtained signals being indicative of an outcome of one or more of: a determination of a type of the communications device, a determination of a line-disconnect of the communications device, a determination of whether the subscriber identifier corresponding to the communications device has been ported, a determination of an occurrence of at least one previous interaction between the authenticator and the communications device, a determination of a measure of activity of the communications device, a determination of whether an identification of a party accompanies an outgoing communication involving the communications device, and one or more signals indicating multi-factor authentication of the communications device, and/or a determination of whether the communications device corresponds to a non-mobile device.

In particular embodiments, the processor coupled to the at least one non-transitory memory device may assign a weighting factor comprising an increased value responsive to the at least one of the one or more signals indicating a relatively more recent event. The processor coupled to the at least one memory device may additionally assign a weighting factor comprising a decreased value responsive to the at least one of the one or more signals indicating a relatively less recent event. In particular embodiments, the processor coupled to the at least one memory device is additionally to transmit a query to at least one database of the one or more databases, wherein the query to request whether any person can be expected to respond to a telephone call. The processor coupled to the at least one memory device may also compute the contactability metric based, at least in part, on a response to the query. The processor coupled to the at least one memory device may additionally be to transmit a query to at least one database of the one or more databases, wherein the query is to indicate whether a predetermined individual can be expected to respond to a telephone call. The at least one database may comprise bureau and utility data and/or may comprise a yellowbook type database. The processor coupled to the at least one memory device may be additionally to obtain a response to the query transmitted to the database of the one or more databases, to determine that the predetermined individual is not expected to respond to the telephone call, and may additionally determine a parameter relating to an individual that is different from the predetermined individual that is expected to respond to the telephone call. The processor coupled to the at least one memory device may additionally compute the contactability metric based, at least in part, on a response to the query. The processor coupled to the at least one memory device may additionally be to compute a revised contactability metric of the communications device based, at least in part, on a linkage between two or more telephone numbers to correspond to the communications device. In particular embodiments, the processor coupled to the at least one memory device may additionally be to compute a fresh contactability metric for a linked telephone number based, at least in part, on the linkage between the two or more telephone numbers corresponding to the communications device.

One general aspect comprises an article including: a non-transitory storage medium having instructions stored thereon executable by a special-purpose computing platform to obtain, via a communications network coupled to a client computing resource, signals indicative of a subscriber identifier, to compute a contactability metric of a communications device to correspond to the subscriber identifier, in which the contactability metric to relate to a likelihood that the communications device can be electronically contacted within a particular interval, wherein the contactability metric to be computed responsive to the obtained signals from one or more databases being made accessible to an authenticator, the obtained signals being indicative of a presence of one or more signals relating to a type of the communications device. The instructions may additionally be to determine a line-disconnect of the communications device. The instructions may additionally be to determine whether the subscriber identifier to correspond to the communications device has been ported. The instructions may additionally be to determine an occurrence of at least one previous interaction between the authenticator and the communications device. The instructions may additionally be to determine a measure of activity of the communications device. The instructions may additionally be to determine whether an identification of a party accompanies an outgoing communication involving the communications device. The instructions may additionally be to obtain signals relating to multifactor authentication of the communications device. The instructions may additionally be to determine whether the communications device corresponds to a non-mobile device.

In particular embodiments, the stored instructions executable by the special-purpose computing platform are additionally to compute a contactability metric responsive to assigning a weighting factor to at least one of the one or more obtained signal types. The instructions may additionally be to assign a weighting factor that is to comprise an increased value responsive to the at least one of the one or more signals indicating a relatively more recent event. Instructions may additionally be to assign a weighting factor that is to comprise a decreased value responsive to the at least one of the one or more signals indicating a relatively less recent event. The instructions may additionally be to transmit a query to at least one database of the one or more databases, the query to request whether any person can be expected to respond to a telephone call. The instructions may additionally be to compute the contactability metric based, at least in part, on a response to the query. The instructions may additionally be to transmit a query to at least one database of the one or more databases, the query may represent whether a predetermined individual can be expected to respond to a telephone call. The at least one database of the one or more databases may comprise a database of bureau and utility data and/or may comprise a yellowbook type database. An authenticator may compute a contactability metric based, at least in part, on a response to the query. Instructions may additionally be to compute a revised contactability metric of the communications device based, at least in part, on a linkage between two or more telephone numbers to correspond to the communications device.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

Figure 1:
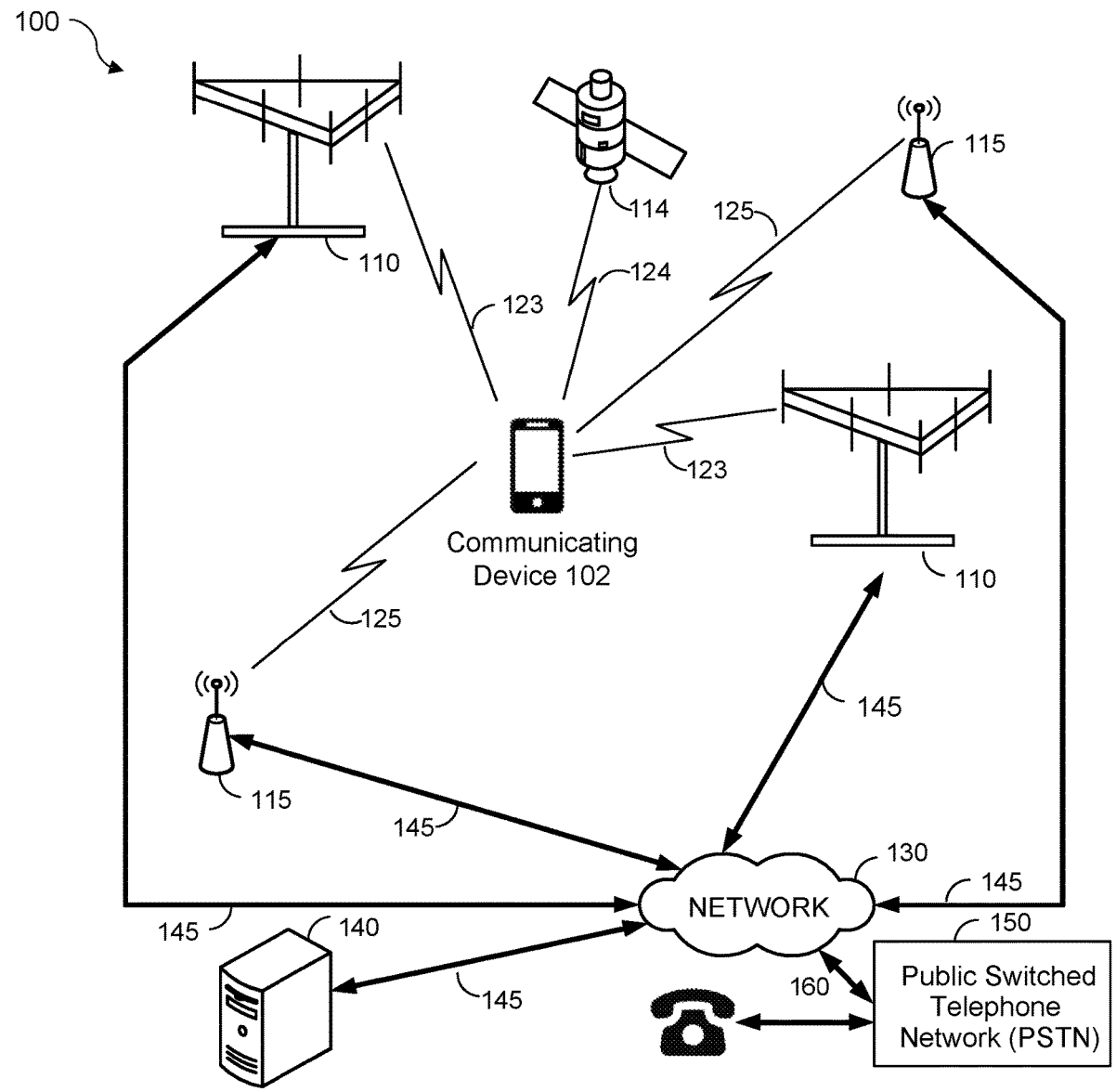
FIG. 1 is a diagram of a communications infrastructure that includes both wireless and wireline communications devices, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Throughout this specification, references to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, devices that communicate electronically, such as wireless mobile communications devices, voice-over-Internet-protocol (VoIP) communications devices, and devices representing the Internet of things (e.g., wireless sensors, wireless appliances, wireless industrial, commercial, and household machines, etc.) continue to increase in popularity. As these types of devices gain in popularity, a need to authenticate, verify, and/or validate such electronic communications devices also increases. As a complement to such authentication, it may be advantageous to contact (e.g., telephonically) a subscriber associated with a particular communications device so as to facilitate additional verification of the communications device by an authenticated individual. Authentication of a communications device, and/or an ability to contact the subscriber co-located with a communications device may be especially beneficial in environments that facilitate financial transactions utilizing wireless communications devices. Such transactions may involve completing applications for credit, engaging in electronic financial transactions, purchasing products and/or services, obtaining access to privileged content, completing loan applications, completing forms involved with applying for healthcare coverage (such as in connection with visiting a health provider's office or otherwise requesting healthcare services), and/or engaging in a number of other types of transactions via a communications device. In other environments, such as environments involving IOT devices, authenticating subscribers co-located with wireless communications devices, and contacting such subscribers, may authorize remote access to various sensors, appliances, machines, and instruments, in which output signals from such devices may be utilized to drive numerous decision-making processes.

To facilitate transactions involving communications devices, and/or to obtain signal outputs from trusted communicating IOT devices, a subscriber co-located with, or otherwise affiliated with, a communications device may establish an identity. An identity may be established in connection with a subscriber account with a cellular or mobile wireless communications services carrier, a VoIP services provider, or other type of communication services carrier. Establishing an account associated with a communications device, utilizing, for example, a subscriber account identifier (e.g., a cellular telephone number, a universally unique identifier or UUID, etc.), may permit an individual attempting to engage in an electronic or digital transaction to be authenticated, authorized, and/or verified prior to engaging in the transaction. In other instances, an account associated with a communications device may operate to provide a measure of confidence that authorized individuals (exclusively) may obtain parameters from IOT devices and/or modify or influence operations of such IOT devices. In some instances, in view of the nature of electronic or digital transactions, which may take place within a communications infrastructure at any time and at any location, it may be useful to quickly verify and/or authenticate a communications device. Such authentication and/or verification may thus occur in a real-time or near-real-time fashion.

In addition to authenticating a communications device, which may facilitate a determination that a certain subscriber regularly or at least occasionally utilizes a certain communications device, it may be advantageous to determine the likelihood that the specific subscriber will respond to an incoming telephone call. Such contactability of a subscriber that is regularly or at least occasionally co-located with a communications device may hasten or accelerate the transaction involving the particular communications device without increasing risk that an unscrupulous individual, who may be impersonating the particular subscriber, can engage in a fraudulent or deceptive transaction.

In a financial services environment, for example, authentication and/or verification of a subscriber operating, or at least co-located with, a communications device may be desirable in response to a client institution or organization (e.g., a financial institution, a brokerage, a healthcare provider, content provider, etc.) seeking to determine and/or prove identity of the transacting party. In another example, such as in an IOT environment, authentication and/or verification of a communications device may be desirable as a means of verifying integrity of input signals and/or control settings, which may control or influence IOT devices. Authentication and/or verification of a communications device may involve establishing a bind between an authenticating entity and a real-world identity of a subscriber operating a communications device and/or a subscriber associated with one or more IOT devices. In such contexts, a subscriber account identifier, which may exist in a digital domain, may operate to establish a persistent, continuing, and objectively verifiable correspondence or affiliation between a communications device and a subscriber in possession of, or at least associated with, a particular communications device. Thus, in a financial services environment, for example, a unique subscriber account identifier may be employed to signify and/or to identify a particular transacting party. In this context, the term "mobile communications device identity" and/or similar terms refer to an identity that leverages a mobile communications device account relationship of a subscriber as a source of authentication and/or verification of a transacting party. Also in this context, the term "mobile subscriber device account" and/or similar terms refer to a mobile communication services provider account. The terms "mobile communications device services provider," "mobile communications device carrier," and "mobile network operator" may be used interchangeably. Furthermore, in this context, the term "mobile device services carrier," "communication services carrier," "services carrier," or simply "carrier" may refer to an entity operating within a communications infrastructure to provide wired and/or wireless communication services to the public for a consideration, such as a monthly subscription fee.

In the context of the present disclosure, a "communication services carrier" may refer to a mobile communication services provider and/or mobile network operator. However, there are examples of carriers that do not correspond to mobile communications device services providers and/or mobile network operators. Such instances may include wireline services providers (for example, providers of services that operate within the public switched telephone network or PSTN), which include wireline services for rotary-dial telephones and/or telephones utilizing, for example, dual tone multi-frequency (DTMF) signaling. In a given situation, particular context of usage should indicate if a term is being used in a general sense or in a narrower sense, such as referring to a mobile communications device services provider, wireline services provider, mobile paging services provider, and/or mobile network operator, for example.

Other aspects of verifying or authenticating a communications device (e.g., a mobile communications device, an IOT device, etc.) and/or determining a contactability metric of a communications device are also described in greater detail hereinbelow. For example, in an embodiment, authenticating a subscriber or an owner of an IOT device, may bring about establishment of a bind between an individual and a mobile subscriber account. Further, a mobile subscriber account is merely an example approach toward establishing a correspondence between an individual and a communications device, and claimed subject matter is not intended to be limited to accounts established for mobile cellular communications devices and IOT devices. Rather, the term "account" or "subscriber account" in this context refers generally to a formal business arrangement between a provider of the account and an entity, a person, or other party seeking to obtain privileges associated with the account. Thus, the term "account" is intended to be broadly interpreted as an arrangement that may provide certain privileges. In this context, privileges may involve access to credit (e.g., so as to facilitate the present or future purchase of goods or services), access to privileged content (e.g., such as premium sports, cinema, or other entertainment content), access to healthcare services and/or healthcare records, access to financial records, access to financial and/or brokerage accounts, access to parameters transmitted by IOT devices, an ability to control operation of IOT devices, and so forth. In this context, the term "privileged content" is intended to be interpreted broadly so as to encompass any type of content available exclusively to certain individuals and/or certain entities in response to supplying certain credentials to a bank or financial institution, an IOT device, a mobile communication services provider, and so forth.

Also in this context, the term "contactability metric" or "contactability score" refers to a probability or a likelihood that a subscriber, such as an account holder, or other party that regularly or at least occasionally is co-located with a particular communications device, can be reached via placement of a telephone call, transmitting of a text message, or other signaling, from an authenticating entity, for example, to the communications device. "Contactability" may additionally refer to a probability or likelihood that an individual associated with, colocated with, or in possession of a particular communications device can be reached via placement of a telephone call, text message, or other signaling, from a party other than an authenticating entity, such as a client computing resource under the control and/or influence of a financial institution, content provider, healthcare institution, and so forth. In such context, a relatively high contactability metric may represent a relatively high probability or likelihood that a predetermined individual can be contacted utilizing a particular communications device within a predetermined interval. On the other hand, a relatively low contactability metric may represent a relatively low probability or likelihood that a predetermined individual can be contacted utilizing the particular communications device within a predetermined interval.

Likewise, an account may comprise various attributes. For example, in the context of a mobile cellular communications device (e.g., a mobile cellular telephone), the term "subscriber account identifier" refers to a unique descriptor or feature associated with the account that defines certain aspects of the account. For example, in nonlimiting illustrations, a subscriber account identifier may refer to (or may at least be associated with) a mobile telephone number, a mobile subscriber unique alias, an International Mobile Subscriber Identifier (IMSI), Integrated Circuit Card Identifier (ICC ID), a mobile services and/or other type of identifier (e.g., a unique identifier) employed in connection with the particular mobile network operator or the mobile communication services provider. Mobile communications networks may include those compatible or compliant with a Global System for Mobile Communications (GSM) network, for example. Other examples of mobile subscriber account identifiers may include an International Mobile Equipment Identifier (IMEI), Mobile Station International Subscriber Directory Number (MSISDN), an international mobile subscriber identifier (IMSI), or any other identifier that may be utilized to identify a mobile billing account number/identifier. In the context of an IOT device, a combination of alphanumeric characters (which may function as a subscriber account identifier) may identify an individual authorized to receive or access parameters transmitted from the IOT device. The same or a different combination of alphanumeric characters may identify an individual authorized to modify/influence parameter settings of an IOT device.

As discussed herein, in a financial services environment, a subscriber associated or affiliated with a communications device may apply for an account, such as a credit account, for example, or may apply for any other type of account that imparts or confers particular privileges on the subscriber co-located or in possession of the communications device. In other instances, a subscriber co-located with a mobile device may attempt to engage in a financial transaction, for example, or may attempt to access privileged information/privileged content, just to name a few examples. In still other instances, a subscriber may wish to obtain output parameters or have access to output signals from an IOT device. In these and other instances, to obtain privilege, such as access to credit, access to privileged information (e.g., premium content streaming or other streaming of entertainment), to access output parameters from an IOT device, a mobile subscriber may be required to establish some type of credentials, such as via completion of an application, such as an application for an account. In other instances, a mobile subscriber may complete an application for credit, an application for an increase in an existing line of credit, or may complete any other formal request, which involves the subscriber supplying subscriber-specific parameters. However, as previously alluded to, it may be advantageous for the subscriber, and for the institution or service providing privileges to the subscriber, for example, to verify, authenticate, and/or prove that, indeed, the subscriber is co-located with, or otherwise affiliated with, a particular communications device. By proving affiliation with a particular communications device, an institution or a service may reduce the risk of an unscrupulous individual, for example, accessing privileged information, which may permit the unscrupulous individual to penetrate an IOT network or to impersonate a particular individual. Such fraudulent behavior may facilitate an unscrupulous individual stealing another subscriber's identity or obtaining sensitive information that allows the unscrupulous individual to impersonate another subscriber. In certain instances, such as instances in which control of an IOT device relies or is based, at least in part, on authentication of a predetermined subscriber, impersonation of the subscriber may permit an unscrupulous individual to withdraw funds from a subscriber's account, illegally obtain physical access to a subscriber's home (e.g., such as by unlocking a door controlled by an IOT device), and so forth.

Thus, in particular embodiments, authenticating a particular communications device may permit an authenticating entity to prove that a verified and/or authenticated individual is attempting to engage in a transaction, attempting to access parameters from an IOT sensor, attempting to modify operation of an IOT device, or the like. Obtaining such proof may reduce the likelihood of an unscrupulous individual completing a fraudulent transaction, such as a transaction that involves a credit application, an increase in a credit line, a purchase, an asset sale, access to premium content, access to a subscriber's home or office, or to obtain any other type of privileges via fraud and/or deception. To further reduce an ability by an unscrupulous individual to engage in a fraudulent transaction, an authenticator may compute a contactability metric, which may relate to a probability or a likelihood that a particular subscriber can be contacted, such as via a voice telephone call and/or by responding to a text message. In particular embodiments a particular subscriber having a relatively high contactability metric may represent a relatively low risk that the subscriber is being, or can be, impersonated by an unscrupulous individual. On the other hand, a particular subscriber having a relatively low contactability metric may represent a somewhat higher risk that the subscriber is being, or can be, impersonated by an unscrupulous individual.

In particular embodiments, a contactability metric may be computed or derived via accessing database that stores records concerning various signals related to a communications device co-located with a predetermined subscriber. In some embodiments, records may relate to determination of a type of a communications device, which may include a mobile cellular communications device, a VoIP device, a wireline telephone, and so forth. In some embodiments, such records may give rise to a simple/binary signal in which a communications device may be categorized either as a mobile device or as a non-mobile device. In such instances, a mobile cellular communications device or a VoIP device may give rise to a higher contactability metric than a wireline telephone device. Records may additionally relate to whether a communications device has been recently disconnected from a communication services provider. In some instances, a record indicating that a communications device has been recently disconnected from a communication services provider, such as within the past day, week, month, or other relatively short period of time may give rise to a relatively low contactability metric. In other instances, a record indicating that a communications device was disconnected some time ago, such as a period of time greater than three months, greater than six months, etc., may give rise to a somewhat higher contactability metric, so as to account for the likelihood that a subscriber may have since re-connected the communications device to a services provider. In some instances, a record indicating that a subscriber has ported a subscriber identifier within a predetermined period of time (such as two times within the past one week, three times within the past month, etc.), which may be indicative of fraudulent behavior by the subscriber, a relatively low contactability metric may be assigned. In other instances, responsive to a subscriber having ported a subscriber identifier less than a predetermined number of times, such as one time within the past year, a somewhat higher contactability metric may be assigned.

In some instances, a record indicating occurrence of at least one previous interaction between an authenticator and a communications device, which may indicate that a recognized subscriber actively utilizes a communications device to perform business transactions, may give rise to a relatively high contactability metric. In other instances, responsive to a subscriber not being recognized by an authenticator, which may indicate that a particular subscriber has never engaged (or has not engaged within a predetermined period of time) in a financial or business transaction, may give rise to a somewhat lower contactability metric. In some instances, a record of a subscriber's use of a communications device may influence a contactability metric. For example, a subscriber who routinely utilizes a particular communications device may be assigned a relatively high contactability metric, while a subscriber who seldom utilizes a particular communications device may be assigned a relatively low contactability metric. In some instances, a record to indicate use multi-factor authentication of a subscriber may bring about a relatively high contactability metric, while absence of any record to indicate use of multi-factor authentication may bring about a relatively low contactability metric.

In some instances, a contactability metric may relate to a probability or likelihood that an individual or a party related to a predetermined subscriber (e.g., a spouse, a partner, or other party) may respond to an incoming call, incoming text message, etc. In such instances, a signal to indicate that any one of several parties may respond to an incoming call may give rise to a relatively high contactability metric. In addition, a signal to indicate that a responding party is likely to correspond to a particular (or unique) subscriber may bring about an additional increase in a contactability metric. In particular embodiments, a contactability metric may be determined responsive to one or more of a plurality of the above-identified records which relate to a subscriber's behavior and/or use of a communications device.

In particular embodiments, an authenticator may apply weighting factors to certain types of signals representing particular records. For example, responsive to obtaining a signal to indicate that a particular communications device corresponds to a mobile cellular telephone, an increased weighting factor may be assigned. Additionally, responsive to determining that a particular communications device corresponds to a wireline communications device, a decreased weighting factor may be assigned. Further, signals generated in response to certain recent events, such as events occurring within the past one week, one month, one year, etc., may be assigned an increased weighting factor in relation to signals generated in response to less recent events, such as signals generated in response to events occurring one year ago, two years ago, three years ago, and so forth. In an example, in response to a signal indicating that several years have passed since a subscriber ported a subscriber identifier, a signal indicating such an event may weigh less (or even far less) than a signal indicating that the subscriber has very recently ported the subscriber identifier corresponding to the communications device. In another instance, responsive to determining that a communications device has been relatively active over a predetermined period, such as within the last month, year, or other duration, an increased contactability metric may be assigned.

In particular embodiments, use of a contactability metric may provide a stand-alone measure of authentication of a subscriber. In some instances, use of a contactability metric may be combined with various subscriber behaviors with respect to a subscriber communications device. Thus, in particular embodiments, a contactability metric may be combined with a trustworthiness metric (e.g., a trust score) of a subscriber's communications device, which may be computed utilizing signals to indicate porting of a communications device. In an embodiment, such signals may relate to how often a subscriber has ported a communications device, such as to obtain a new subscriber identifier (e.g., mobile telephone number). In particular embodiments, a contactability metric may be combined with a trustworthiness metric computed utilizing signals to indicate whether a subscriber has recently removed/replaced a SIM of a communications device. In particular embodiments, a contactability metric may be combined with a trustworthiness metric computed based, at least in part, on obtaining signals indicating one or more password resets, which may be implemented via transmission of one-time passwords to a communications device. In particular embodiments, a contactability metric may be combined with a trustworthiness metric computed via obtaining signals indicating tenure of a communications device, which may relate to a duration that a subscriber has owned, operated, or has otherwise been affiliated the device. It should be noted that claimed subject matter is intended to embrace additional contributors to a trustworthiness metric (e.g., a trust score), virtually without limitation.

Although the discussion that follows relates to any type of account, in nonlimiting illustrations, accounts corresponding to communications devices may be used for illustration. However, it is understood that claimed subject matter is intended to not be limited to examples provided primarily for purposes of illustration, since such examples may be oversimplified for purposes of comprehension, for example.

In FIG. 1, corresponding to embodiment 100, communications device 102 corresponds to a device designed primarily to conduct communications via wireless or wireline means, such as to provide mobile wireless telephone communications, texting, web browsing, and so forth. Communications device 102 may additionally correspond to an IOT device, which may comprise any of a wide variety of devices, such as home automation devices (e.g., garage door openers, door locks, thermostats, etc.), Wireless Fidelity (Wi-Fi) enabled large appliances (e.g., washing machines, dryers, refrigerators, etc.), entertainment systems and components (e.g., televisions, stereos, etc.), wearable devices (e.g., smart watches, wearable insulin pumps, etc.), control devices (e.g., air conditioners, heaters, etc.), moisture sensors, humidity sensors, and a myriad of other control devices, sensing devices, monitoring devices, and claimed subject matter is not limited in this respect. In some instances, communications device 102 may provide a means of authenticating a subscriber, such as by way of an application program (or "app") that executes via a processor of a mobile communications device, which operates to provide access to input signals of an IOT device or to provide access to output signals of an IOT device.

In the embodiment of FIG. 1, communications device 102 may transmit radio signals to, and receive radio signals from, a wireless communications network. In an example, communications device 102 may communicate with a cellular communications network by transmitting wireless signals to, and/or receiving wireless signals from, a cellular transceiver 110, which may comprise a wireless base transceiver subsystem, a Node B or an evolved NodeB (eNodeB), over wireless communication link 123. Similarly, communications device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit communications device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the 3$^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless communications network for a service (e.g., under a service contract). In the embodiment of FIG. 1, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 via communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between communications device 102 at a call source and server 140 through local transceiver 115 or cellular transceiver 110. In an embodiment, network 130 may also facilitate communication between communications device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with communications device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to communications device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between communications device 102 and cellular transceiver 110, satellite 114, local transceiver 115, and so forth may occur utilizing signals communicated across wireless or wireline communications channels. Accordingly, the term "signal" may refer to communications utilizing propagation of electromagnetic waves or electronic signals via a wired or wireless communications channel. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in one or more signals using one or more of the above-identified modulation techniques.

In particular implementations, and as discussed below, communications device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of communications device 102 based on these location related measurements. In some implementations, location related measurements obtained by communications device 102 may be transferred to a location server such as an enhanced serving mobile location center (E-SM LC) or SUPL location platform (SLP) (e.g. which may comprise a server, such as server 140) after which the location server may estimate or determine an estimated location for communications device 102 based on the measurements. In the presently illustrated example, location related measurements obtained by communications device 102 may include measurements of signals 124 received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Communications device 102 or a separate location server may obtain a location estimate for communications device 102 based on location related measurements using any one of several position methods such as, for example, GNSS, Assisted GNSS (A-GNSS), Advanced Forward Link Trilateration (AFLT), Observed Time Difference Of Arrival (OT-DOA) or Enhanced Cell ID (E-CID) or combinations thereof. In some of these techniques (e.g. A-GNSS, AFLT and OTDOA), pseudoranges or timing differences may be measured at communications device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at communications device 102. Here, server 140 may be capable of providing positioning assistance data to communications device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, communications device 102 may obtain measurements of signal strengths for signals received from cellular transceiver 110 and/or local transceiver 115 and/or may obtain a round trip signal propagation time (RTT) between communications device 102 and a cellular transceiver 110 or local transceiver 115. A communications device 102 may use these measurements together with assistance data (e.g. terrestrial almanac data or GNSS satellite data such as GNSS Almanac and/or GNSS Ephemeris information) received from server 140 to determine a location estimate for communications device 102 or may transfer the measurements to server 140 to perform the same determination. A call from communications device 102 may be routed, based on the location of communications device 102, and connected to PSTN 150, for example, via wireless communication link 123 and communications link 160.

A mobile device at a call source (e.g., communications device 102 of FIG. 1) may be referred to by any name corresponding to a cellphone, smartphone, laptop, tablet, PDA, tracking device or some other portable or movable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network in which a user may employ audio, video and/or data I/O devices and/or body sensors and a separate wireline or wireless modem. An estimate of a location of a mobile device (e.g., communications device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

Responsive to communications device 102 comprising a mobile cellular communications device, device 102 may comprise an embedded sensor suite which may, for example, include inertial sensors and environment sensors. Inertial sensors of communications device 102 may comprise, for example accelerometers (e.g., collectively responding to acceleration of communications device 102 in and x-direction, a y-direction, and a z-direction). Communications device 102 may further include one or more gyroscopes or one or more magnetometers (e.g., to support one or more compass applications). Environment sensors of communications device 102 may comprise, for example, temperature sensors, barometric pressure sensors, ambient light sensors, camera imagers, microphones, just to name few examples. Sensors of communications device 102 may generate analog or digital signals that may be stored in utilizing one or more memory locations internal to device 102 in support of one or more applications such as, for example, applications collecting or obtaining biometric attributes of a user (e.g., a subscriber) of communications device 102.

The architecture of the cellular communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
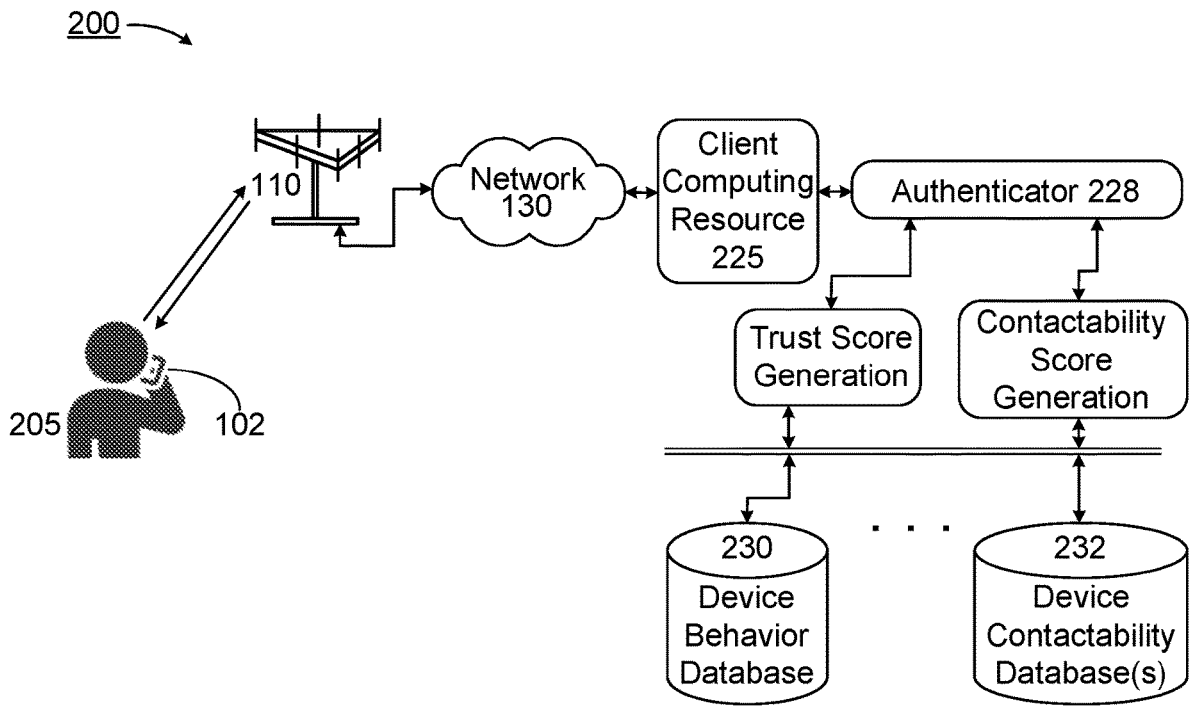
FIG. 2 is a diagram of a subscriber in possession of a communications device to permit interaction between or among a client computing resource and an authenticator, according to an embodiment.

In view of the communications infrastructure shown and described in reference to FIG. 1, more particular embodiments directed toward computing a contactability metric of a communications device are discussed hereinbelow. Thus, in embodiment 200, as depicted in FIG. 2, a subscriber is shown co-located with communications device 102, which may correspond to a mobile cellular communications device. Communications device 102 may interact with client computing resource 225 and authenticator 228. In the embodiment of FIG. 2, mobile subscriber 205 and communications device 102 may be located at any point within communications range of cellular transceiver 110. As shown in FIG. 2, communications device 102 may communicate with client computing resource 225 via network 130 utilizing a wireless communications channel between the communications device and cellular transceiver 110. It should be noted, however, that claimed subject matter is not limited exclusively to wireless communications between communications device 102 and cellular transceiver 110. For example, in particular embodiments, communications device 102 may communicate with client computing resource 225 by way of one or more intervening Wi-Fi networks or by way of wireline telephone services (e.g., the public switched telephone network).

Subscriber 205, utilizing communications device 102, may attempt to engage in a financial transaction via client computing resource 225. Client computing resource 225 may represent or signify a bank (or other type of financial institution), a real estate title company, a healthcare provider, a content provider, or any other type of entity that may, at least from time to time, require verification, authentication, and/or auditing of communications device 102 prior to permitting a transaction to take place. In an alternative embodiment, communications device 102 may represent an IOT device, which may operate to transmit output signals representing, for example, sensor measurements, which may be utilized by a client computing resource, which may facilitate decision-making processes other than those of a financial nature, such as to support processes involving, for example, other types of IOT devices.

Subscriber 205 may operate communications device 102 to initiate a transaction involving client computing resource 225. In response to subscriber 205 attempting to engage in a financial transaction, client computing resource 225 may communicate with authenticator 228, which may operate to authenticate, verify, and/or audit subscriber 205 operating communications device 102. In the embodiment of FIG. 2, authentication, verification, and/or auditing of subscriber 205 may include authenticator 228 accessing device database 230, which may relate to signals to indicate a record of occurrences with respect to communications device 102. Such signals may be regarded by client computing resource 225 as representing particular levels of trustworthiness of subscriber 205. In particular embodiments, client computing resource 225 may assess trustworthiness of subscriber 205 by obtaining signals to indicate whether (and/or how often) subscriber 205 has ported communications device 102, such as to obtain a new subscriber identifier (e.g., mobile telephone number). Client computing resource 225 may assess trustworthiness of subscriber 205 by obtaining signals to indicate whether subscriber 205 has recently removed/replaced a SIM of a communications device. Client computing resource 225 may assess trustworthiness of subscriber 205 via obtaining signals indicating occurrences of password resets, such as implemented via transmission of one-time passwords to communications device 102. Client computing resource 225 may assess trustworthiness of subscriber 205 by obtaining signals representing tenure of communications device 102, which may relate to a duration that subscriber 205 has owned, operated, or has otherwise been affiliated with device 102. It should be noted that claimed subject matter is intended to embrace additional contributors to a trustworthiness score or trustworthiness measure, virtually without limitation.

In the embodiment of FIG. 2, prior to permitting subscriber 205 to engage in a financial transaction via client computing resource 225, authenticator 228 may establish or form a secure channel between itself and communications device 102. Thus, as previously alluded to, authenticator 228 may initiate a browser-based Internet session between the identity verifier and the communications device. Thus, in particular embodiments, in response to communications device 102 transmitting a subscriber identifier, which may comprise, for example, a mobile telephone number, authenticator 228 may generate and transmit a tailored resource locator (e.g., a specially formulated URL), which may be conveyed to communications device 102 via client computing resource 225, network 130, and cellular transceiver 110. In response to obtaining the URL generated by authenticator 228, communications device 102 may be directed to initiate a secured, browser-based Internet session directly with authenticator 228.

In addition to accessing device behavior database 230, which may include signals indicative of historical records of deterministic events with respect to communications device 102, authenticator 228 may additionally access device contactability database 232. Accessing device contactability database 232 may facilitate generation of a contactability score. Device contactability database 232 may include records that relate to a likelihood that communications device 102 can be electronically contacted, such as via a voice call and/or a text message, which may provide an indication as to whether a particular subscriber (e.g., subscriber 205) is presently co-located with device 102. As mentioned previously herein, a contactability metric or contactability score may be determined or at least estimated responsive to determination of a type of communications device corresponding to device 102, such as whether the device comprises a mobile cellular communications device, a VoIP device, or a wireline communications device. A contactability metric may additionally be based, at least in part, on whether communications device 102 has recently been disconnected from a communications network. A contactability metric may additionally be based, at least in part, on whether a subscriber identifier (e.g., telephone number) has recently been ported from a first communication services carrier to a second communication services carrier. A contactability metric may additionally be based, at least in part, on a measure of activity of communications device 102, which may relate to whether the communications device has recently engaged in messaging functions, incoming or outgoing telephone communications, and so forth. A contactability metric may additionally be based, at least in part, on whether a predetermined subscriber, such as subscriber 205, or another party associated with subscriber 205 (e.g., family members or other persons within the same household as subscriber 205, employees or other persons within the same company as subscriber 205, or individuals having other affiliations with subscriber 205) can be contacted via communications device 102.

In particular embodiments, determining whether a predetermined individual can be expected to answer a telephone call may be determined via accessing a database containing bureau and utility data, which refers to a database operated by a credit reporting bureau. In particular embodiments, determining whether a predetermined individual can be expected to answer a telephone call may be determined via accessing a yellowbook type database. In this context, a yellowbook type database denotes a commercial telephone online publication or other type of publication, which includes publicly available parameters of communications device subscribers that operate fixed or wireline devices. In particular embodiments, in response to obtaining output signals from a database operated by a credit reporting bureau, for example, or from a yellowbook type database, an authenticator may determine that a particular predetermined individual is not expected to respond to a telephone call. In such instances, the authenticator may be capable of determining a parameter (e.g., subscriber name, alias, etc.) of an individual that is different from the predetermined individual. Consequently, the subscriber name, alias, etc. corresponding to the different individual may be transmitted to client computing resource 225.

A contactability metric may additionally be based, at least in part, on whether subscriber 205 has recently taken part in multifactor authentication involving communications device 102. A contactability metric may additionally be based, at least in part, on a relatively simple determination as to whether communications device 102 corresponds to a mobile cellular communications device or a wireline telephone, such as a telephone utilizing the PSTN. Device contactability database 232 may include records relating to other indicators of contactability or reachability of subscriber 205, such as by way of communications device 102, and claimed subject matter is not limited in this respect.

In the embodiment of FIG. 2, authenticator 228 may thus combine a trustworthiness metric (e.g., a trust score) with a contactability metric (e.g., a contactability score) so as to compute composite or complementary measure for transmission to client computing resource 225. Client computing resource 225 may, in turn, apply particular business rules and/or business logic to determine whether a particular transaction, such as a transaction initiated by subscriber 205, should be allowed to take place. In some instances, client computing resource 225, operating in accordance with institution-specific business rules and/or business logic, may combine a trustworthiness metric (e.g., a trustworthiness score) with a contactability metric (e.g., a contactability score) to arrive at a complementary or composite assessment of a subscriber's creditworthiness, ability to repay a loan, authenticity, contactability, reachability, or to determine or estimate any other quality or characteristic of subscriber 205, and claimed subject matter is not limited in this respect. In some instances, a bank, financial institution, or any other client institution may utilize a contactability metric in combination with a trustworthiness metric, to provide a probability or a likelihood that subscriber 205 is being impersonated, for example, by an unscrupulous individual. In another instance, a contactability metric may be utilized to as an approach to increase or to bolster a trustworthiness metric corresponding to a subscriber whose trustworthiness metric may be in need of remediation. In another instance, a contactability metric may be utilized as a final check prior to release of funds, for example, or prior to approving a credit application in the name of subscriber 205. A contactability metric may be utilized for a wide variety of other purposes, and claimed subject matter is intended to embrace all such uses, virtually without limitation.

Figure 3:
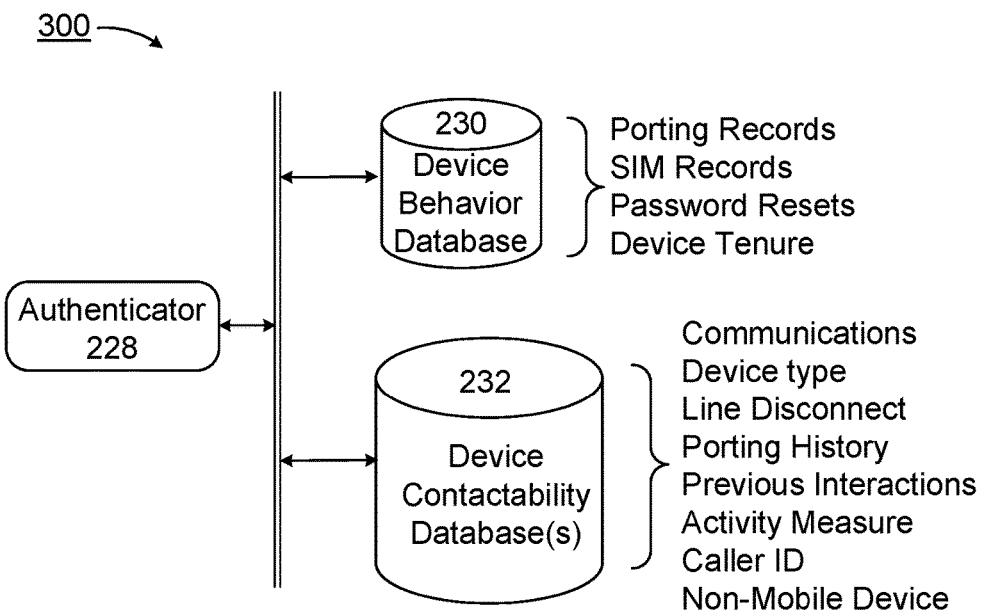
FIG. 3 is a diagram of an authenticator coupled to a device behavior database and a device contactability database, according to an embodiment.

FIG. 3 is a diagram of an authenticator coupled to a device behavior database and a device contactability database, according to an embodiment 300. As shown in FIG. 3, authenticator 228 communicates via a bus structure with device behavior database 230 and with device contactability database 232. It should be noted from FIG. 3, that device contactability database 232 may comprise a plurality of separate databases, such as two separate databases, three databases, five databases, and so forth, and claimed subject matter is not limited in this respect. Accordingly, device contactability database may include several, distinct databases, such as databases that include records relating to communications device types with respect to various subscribers, records relating to line disconnects with respect to various subscribers, porting histories with respect to various subscribers, records of previous interactions of various subscribers with communications networks, caller ID records relating to various subscribers, as well as binary indicators as to whether communications device 102 does/does not correspond to a mobile device may be stored via device contactability database 232. In addition, contactability database 232 may include records of linked subscriber identifiers, such as subscriber identifiers for which a subscriber has initiated a change to the subscriber identifier (such as a subscriber-initiated to a MSISDN or at least a portion thereof). Accordingly, authenticator 228 may be capable of generating a revised contactability metric based, at least in part, on linkage between the two or more telephone numbers corresponding to the communications device. In addition, at least in particular embodiments, authenticator 228 may be capable of generating a fresh contactability metric corresponding to a linked telephone number corresponding to the communications device.

Figure 4:
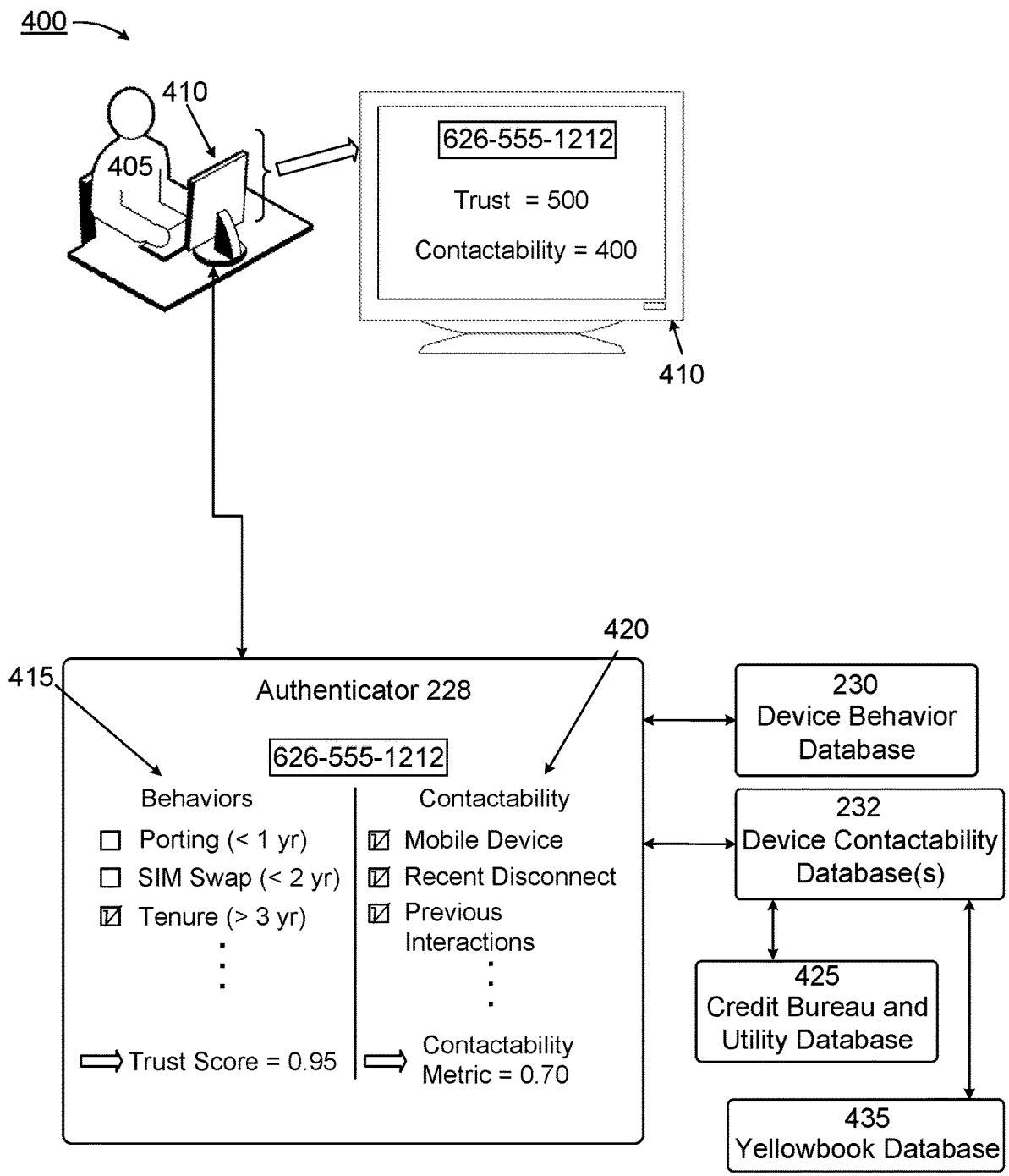
FIG. 4 is a diagram showing certain aspects of an apparatus to generate behavioral parameters and contactability parameters for a communications device, according to an embodiment.

FIG. 4 is a diagram showing certain aspects of an apparatus to generate behavioral parameters and contactability parameters for a communications device, according to an embodiment 400. As shown in FIG. 4, agent 405 may be affiliated with a communication services carrier, a client (e.g., a bank, or other type of financial institution, premium content provider, healthcare provider), a credit reporting bureau, or any other type of institution that could benefit from being advised of a subscriber's trust and/or contactability metrics. Agent 405 is shown viewing a display of a computing resource indicated by 410, which may include an interface for communication with authenticator 228. Authenticator 228 may include an interface that allows communication between or among authenticator 228 device behavior database 230, and device contactability database 232. Thus, as shown in FIG. 4, responsive to a query from agent 405, authenticator 228 may obtain signals relating to behaviors, such as with respect to a particular subscriber's mobile device having a telephone number of 626-555-1212. Agent 405 may benefit from knowing a subscriber's trust score, such as assigned by authenticator 228. Agent 405 may additionally benefit from knowing a subscriber's contactability metric, such as also may be assigned by authenticator 228.

Access to behavioral records as they pertain to a subscriber's use of a communications device may permit authenticator 228 to derive a trustworthiness metric (e.g., a trustworthiness score) of a particular communications device. In addition to accessing records that may influence a trustworthiness metric, authenticator 228 may additionally access records relating to a contactability metric of a communications device. As shown in FIG. 4, authenticator 228 may access, compute, and/or derive parameters related to contactability of a particular communications device, such as via one or more indicators to identify a communications device as a mobile device, one or more indicators to identify whether a communications device has recently been disconnected, and one or more indicators to determine whether a communications device has previously interacted with a communication services provider. Contributing factors to a contactability metric may include additional indicators and/or parameters, and claimed subject matter is not limited in this respect.

Although not shown explicitly in FIG. 4, authenticator 228 may additionally access, compute, and/or derive one or more subscriber identifiers (e.g., mobile telephone number 626-555-1212), which may be "linked" to a previously-assigned subscriber identifier. In particular embodiments, display of subscriber identifiers that may correspond to linked subscriber identifiers, may provide an indication of a subscriber that may wish to impersonate another subscriber, such as by co-opting a subscriber identifier currently or previously assigned to a subscriber. Accordingly, responsive to a subscriber (or other individual) attempting to modify subscriber identifier (e.g., by way of a change to a MSISDN of a subscriber), such changes can be reflected in a contactability metric and/or in a trust score. Alternatively, or in addition to, responsive to a subscriber modifying a subscriber identifier (e.g., by way of a change to a MSISDN of a subscriber), such change can also be reflected in a fresh contactability metric corresponding to a linked subscriber identifier and/or in a subscriber's trust score.

After accessing, computing, and/or deriving behavioral parameters that pertain to a subscriber's use of a communications device, and after accessing, computing, and/or deriving contactability parameters that pertain to whether a predetermined subscriber, for example, is likely to be reached via a telephone call, trust and contactability scores may be displayed via computing resource 410. In particular embodiments, a contactability parameter relating to whether a predetermined subscriber is likely to be reached via a telephone call or text message may involve accessing a bureau and utility database (e.g., a database operated by a credit reporting bureau) and/or may involve accessing a yellowbook type database (e.g., a commercially available database that stores parameters pertaining to subscribers of fixed, wireline communications devices). Authenticator 228 may operate to convey one or more measures of parameters and/or contactability metrics to computing or a text message, authenticator 228 may communicate with computing resource 410 operated by agent 405. Thus, agent 405 may be capable of viewing one or more indexes that are derived from quantities accessed, computed, and/or derived by authenticator 228. For example, as shown in FIG. 4, authenticator 228 may compute, access, and/or derive a trust score utilizing behaviors 415, which may result in a trust score of 0.95. Authenticator 228 may, in turn, transmit the trust score or as shown in FIG. 4, may transmit a trust score alias or index of, for example, 500. Also as shown in FIG. 4, authenticator 228 may compute, access, and/or derive a contactability metric of 0.70. Authenticator 228 may, in turn, transmit this value or may transmit a contactability alias or index, for example, of 400. A contactability metric may be expressed in any form, such as a score from 1-5, a score from 0.0 to 1.0, or any other convenient, meaningful form. Authenticator 228 may transmit signals representing a trust score and/or signals representing a contactability metric in forms other than decimal or numeric form, such as utilizing alphabetical indicators, such as A, AA, AB, B, B+, or in any other convenient form.

Responsive to obtaining signals representative of a trust score and a contactability metric, agent 405 may apply an institution's business rules and/or business logic to determine, for example, creditworthiness of a particular subscriber. In another example, such as an example in which agent 405 represents a healthcare provider, a provider of premium content, or represents any other type of institution who may occasionally or regularly grant particular certain privileges to subscribers, agent 405 may utilize a combination of behavioral factors with respect to a particular communications device as well as contactability factors to determine whether certain privileges, transactions, and/or other actions, perhaps initiated by subscriber 205 operating communications device 102, should be permitted to occur. In other instances, agent 405 may rely exclusively on signals representing a trust score and/or signals representing a contactability metric to determine whether certain privileges, transactions, and/or other actions are to be permitted to occur. In still other instances, agent 405 may rely exclusively on signals related to contactability factors (e.g., contactability metrics 420) to determine whether certain privileges, transactions, and/or other actions are to be permitted to occur. It should be noted that claimed subject matter is intended to embrace all such uses of contactability metrics, behavioral metrics, and signals derived from such quantities, either as standalone metrics or in combination with one another, to determine whether certain privileges, transactions, and/or other actions are to be permitted to occur.

In the embodiment of FIG. 4, device contactability database 232 may obtain signals from credit bureau and utility database 425. Credit bureau and utility database 425 may correspond to a financial and/or credit reporting database, or may correspond to any other type of repository storing one or more of consumer credit scores, credit records, credit histories, and so forth. Device contactability database 232 may additionally obtain signals from a publicly available database, such as a yellowbook type database, which includes names and/or physical addresses of individuals obtaining fixed, wireline telephone services. It should be noted that in particular embodiments, responsive to a determination that a particular individual is not expected (or unlikely) to be reached at a particular telephone number, for example, one or more of databases 425 and 435 may provide output signals corresponding to an individual different than the particular individual, such as a name or alias of a different individual who can be expected to be reachable or contactable at the telephone number.

Figure 5:
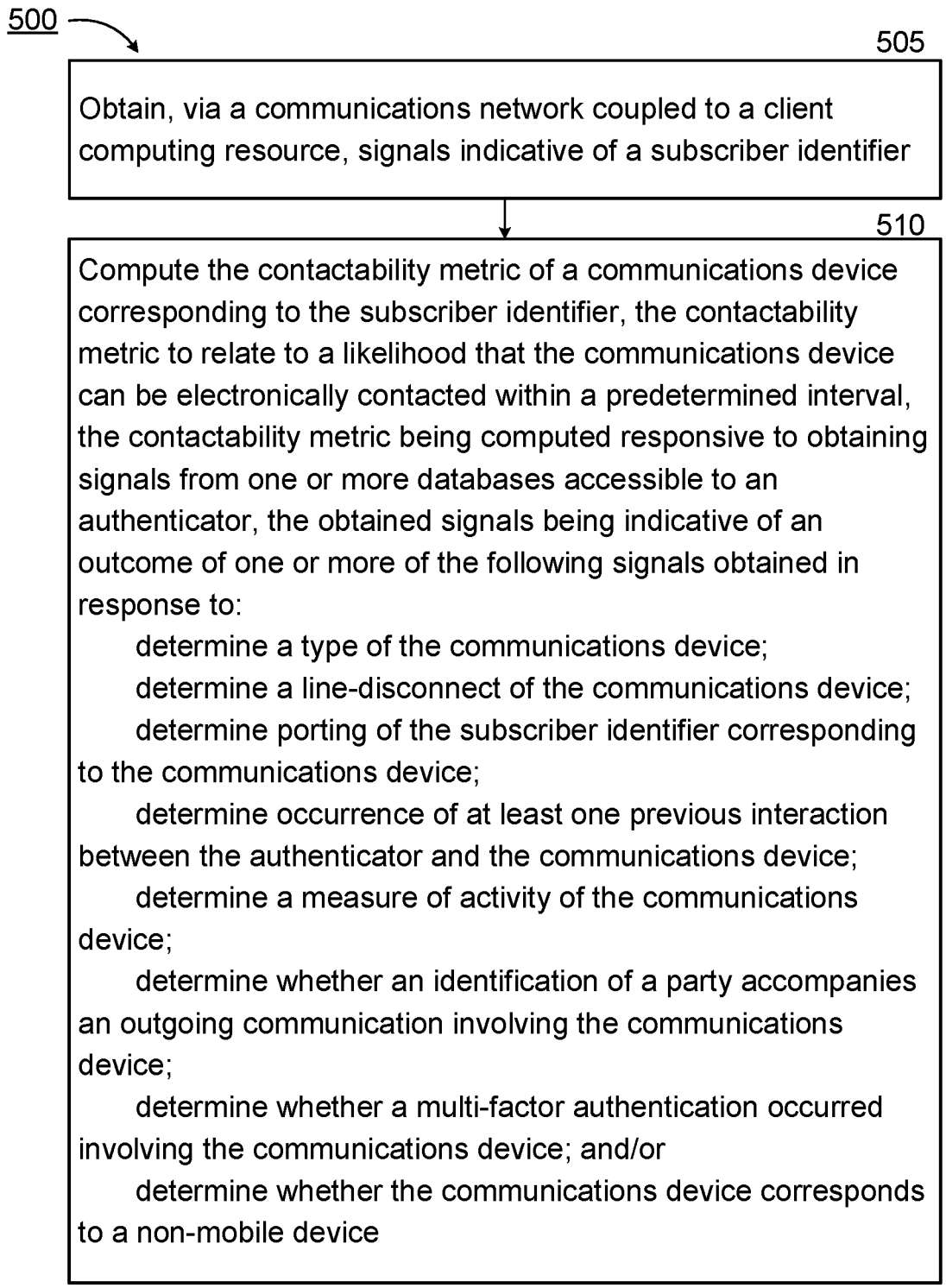
FIG. 5 is a flowchart for a process of determining a contactability metric for communications device, according to an embodiment 500.

FIG. 5 is a flowchart for a process of determining a contactability metric for communications device, according to an embodiment 500. It should be noted that the process represented by the flowchart of FIG. 5 may include actions in addition to those depicted in the figure and/or may include actions arranged in an order different than shown in FIG. 5. The embodiment of FIG. 5 may begin at 505, which may include obtaining, such via a communications network coupled to a client computing resource, signals indicative of a subscriber identifier. A subscriber identifier may include a mobile telephone number, for example, or any other identifier that operates to uniquely identify a particular communications device to a communication services carrier. The method may continue at 510, which may include computing the contactability metric with respect to the communications device corresponding to the subscriber identifier. The contactability metric may relate to a likelihood that the communications device can be electronically contacted within a predetermined interval. The contactability metric may be computed responsive to obtaining signals from one or more databases accessible to an authenticator. Obtained signals may be indicative of a determination of events such as: determining a type of the communications device; determining a line-disconnect of the communications device; determining porting of the subscriber identifier corresponding to the communications device; determining occurrence of at least one previous interaction between the authenticator and the communications device; determining a measure of activity of the communications device; determining whether an identification of a party accompanies an outgoing communication involving the communications device; determining presence of a signal indicating whether a multi-factor authentication involving the communications device has occurred; and/or determining whether the communications device corresponds to a non-mobile device.

Figure 6:
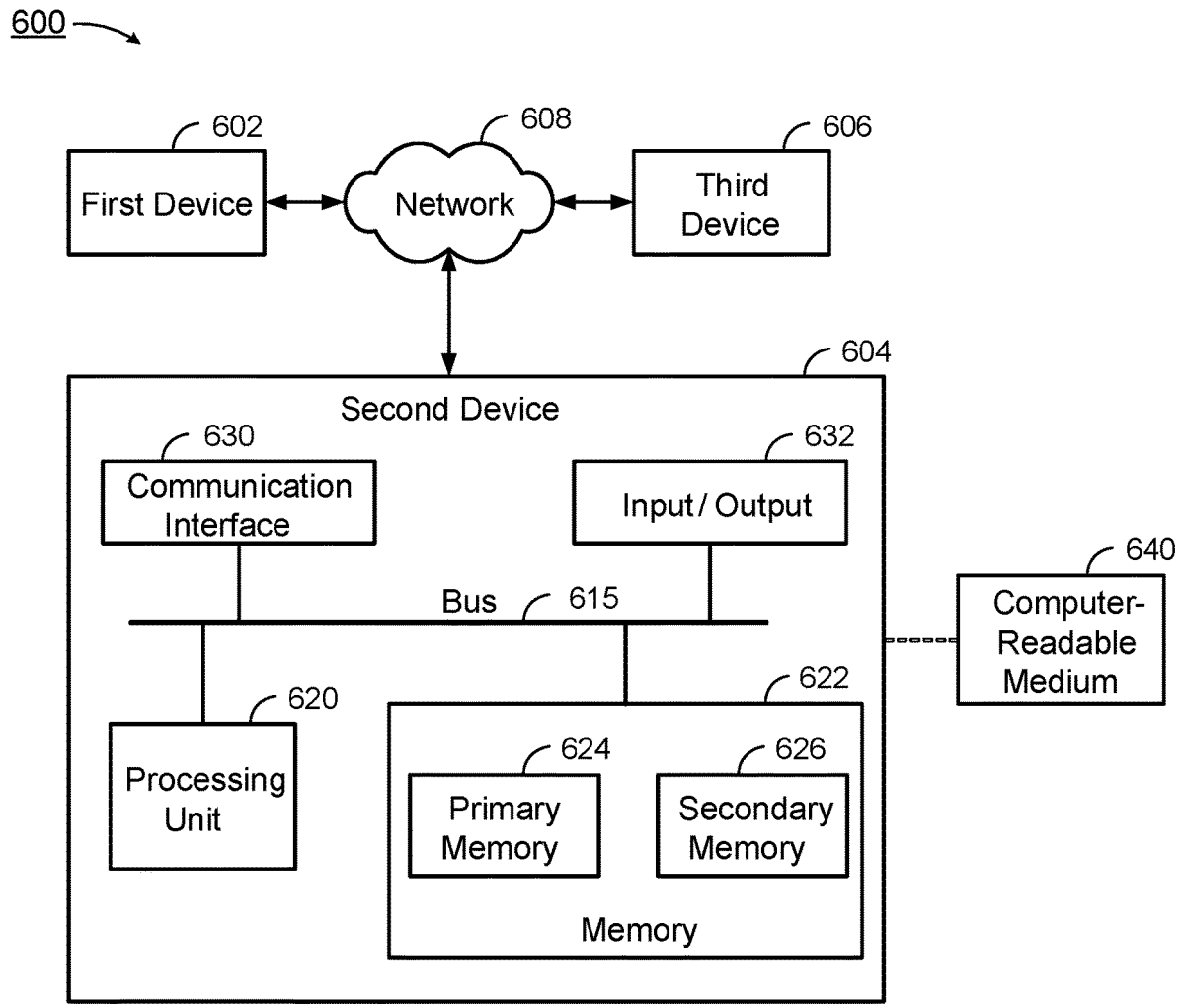
FIG. 6 is a diagram showing a computing environment, according to an embodiment.

FIG. 6 is a diagram showing a computing environment, according to an embodiment 600. In the embodiment of FIG. 6, first and third devices 602 and 606 may be capable of rendering a graphical user interface (GUI) for a network device, such as server device 140 of FIG. 1, so that a subscriber utilizing a communications device (e.g., a mobile cellular communications device, an IOT device, etc.) may engage in system use. Device 604 may potentially serve a similar function in this illustration. Likewise, in FIG. 6, computing device 602 ('first device' in FIG. 6) may interface with computing device 604 ('second device' in FIG. 6), which may, for example, also comprise features of a client computing device and/or a server computing device, in an embodiment. Processor (e.g., processing device) 620 and memory 622, which may comprise primary memory 624 and secondary memory 626, may communicate by way of a communication interface 630, for example. The term "computing device," or "computing resource" in the context of the present patent application, refers to a system and/or a device, such as a computing apparatus that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 604, as depicted in FIG. 6, is merely one example, and claimed subject matter is not limited in scope to this particular example.

In FIG. 6, computing device 602 may provide one or more sources of executable computer instructions in the form of physical states and/or signals (e.g., stored in memory states), for example. Computing device 602 may communicate with computing device 604 by way of a network connection, such as via network 608, for example. As previously mentioned, a connection, while physical, may be virtual while not necessarily being tangible. Although computing device 604 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 622 may comprise any non-transitory storage mechanism. Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 622 may comprise one or more articles utilized to store a program of executable computer instructions. For example, processor 620 may fetch executable instructions from memory and proceed to execute the fetched instructions. Memory 622 may also comprise a memory controller for accessing device readable-medium 640 that may carry and/or make accessible digital content, which may include code, and/or instructions, for example, executable by processor 620 and/or some other device, such as a controller, as one example, capable of executing computer instructions, for example. Under direction of processor 620, a non-transitory memory, such as memory cells storing physical states (e.g., memory states), comprising, for example, a program of executable computer instructions, may be executed by processor 620 and able to generate signals to be communicated via a network, for example, as previously described. Generated signals may also be stored in memory, also previously suggested.

Memory 622 may store electronic files and/or electronic documents, such as relating to one or more users, and may also comprise a machine-readable medium that may carry and/or make accessible content, including code and/or instructions, for example, executable by processor 620 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 620 may comprise one or more circuits, such as digital circuits, to perform at least a portion of a computing procedure and/or process. By way of example, but not limitation, processor 620 may comprise one or more processors, such as controllers, micro-processors, micro-controllers, application specific integrated circuits, digital signal processors, programmable logic devices, field programmable gate arrays, the like, or any combination thereof. In various implementations and/or embodiments, processor 620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 604 as including a component 632 operable with input/output devices, and communication bus 615, for example, so that signals and/or states may be appropriately communicated between devices, such as device 604 and an input device and/or device 604 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more communications devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a client computing device and/or a communications device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a communications device and/or a client computing device in various embodiments. Network devices capable of operating as a client computing device, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a communications device, as well as other types of devices, including between wired and/or wireless devices coupled via a wired and/or wireless network, for example, or any combination thereof. It is noted that the terms, server, server device, server computing device, server computing platform and/or similar terms are used interchangeably.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communications devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a subscriber, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a communications device application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of computing a contactability metric of a subscriber identifier, comprising:
    obtaining, via a communications network coupled to a client computing resource, signals indicative of the subscriber identifier;
    computing the contactability metric of a communications device corresponding to the subscriber identifier, the contactability metric to relate to a likelihood that the communications device can be electronically contacted within a predetermined interval, the contactability metric being computed responsive to one or more signals from one or more databases accessible to an authenticator, the one or more signals being indicative of a presence of one or more of the following signals obtained in response to:
    determining a type of the communications device;
    determining a line-disconnect of the communications device;
    determining porting of the subscriber identifier corresponding to the communications device;
    determining occurrence of at least one previous interaction between the authenticator and the communications device;
    determining a measure of activity of the communications device;
    determining whether an identification of a party accompanies an outgoing communication involving the communications device;
    determining whether a multi-factor authentication occurred involving the communications device; and/or
    determining whether the communications device corresponds to a non-mobile device.

2. The method of claim 1, further comprising:
    computing the contactability metric responsive to assigning a weighting factor to at least one of the one or more signals.

3. The method of claim 2, wherein the weighting factor comprises an increased value responsive to the at least one of the one or more signals indicating a relatively more recent event, and wherein the weighting factor comprises a decreased value responsive to the at least one of the one or more signals indicating a relatively less recent event.

4. The method of claim 1, further comprising:
    transmitting a query to at least one database of the one or more databases, the query requesting whether any person can be expected to respond to a telephone call; and
    computing the contactability metric based, at least in part, on a response to the query.

5. The method of claim 1, further comprising:
    transmitting a query to at least one database of the one or more databases, the query representing whether a predetermined individual can be expected to respond to a telephone call; and
    computing the contactability metric based, at least in part, on a response to the query.

6. The method of claim 5, wherein the at least one database comprises bureau and utility data and/or comprises a yellowbook type database.

7. The method of claim 5, further comprising:
    obtaining a response to the query transmitted to the database of the one or more databases;
    determining that the predetermined individual is not expected to respond to the telephone call; and
    determining a parameter relating to an individual, different from the predetermined individual, that is expected to respond to the telephone call.

8. The method of claim 1, wherein the subscriber identifier corresponds to a telephone number, further comprising:
    detecting a linkage between two or more telephone numbers corresponding to the communications device.

9. The method of claim 8, wherein detecting the linkage between the one or more telephone numbers corresponds to determining a change history of a Mobile Station International Subscriber Directory Number (MSISDN) of the communications device.

10. The method of claim 8, further comprising:
    computing a revised contactability metric of the communications device based, at least in part, on the linkage between the two or more telephone numbers corresponding to the communications device.

11. The method of claim 8, further comprising:
    computing a fresh contactability metric for a linked telephone number based, at least in part, on the linkage between the two or more telephone numbers corresponding to the communications device.

12. The method of claim 1, further comprising:
    establishing a browser-based session, a session formed utilizing an application program interface (API), or a session formed utilizing a subscriber management system or database, to facilitate communications between a client computing device and the client computing resource; and
    receiving, via a user interface of the client computing device, the subscriber identifier.

13. The method of claim 1, wherein the subscriber identifier corresponds to a mobile cellular telephone number, a landline telephone number, or an identifier corresponding to a voice-over-IP communications device.

14. An apparatus to compute a contactability metric of a subscriber identifier, comprising:
    a processor coupled to at least one memory device to:
    obtain, via a communications network coupled to a client computing resource, signals indicative of the subscriber identifier;
    compute the contactability metric of a communications device corresponding to the subscriber identifier, the contactability metric to relate to a likelihood that the communications device can be electronically contacted within a particular interval, the contactability metric to be computed responsive to one or more signals from one or more databases being made accessible to an authenticator, the one or more signals being indicative of a presence of one or more of the following signals to be obtained in response to:
    determination of a type of the communications device;
    determination of a line-disconnect of the communications device;
    determination of whether the subscriber identifier corresponding to the communications device has been ported;

determination of an occurrence of at least one previous interaction between the authenticator and the communications device;

determination of a measure of activity of the communications device;

determination of whether an identification of a party accompanies an outgoing communication involving the communications device;

determination of whether a multi-factor authentication has occurred involving the communications device; and/or determination of whether the communications device corresponds to a non-mobile device.

15. The apparatus of claim 14, wherein the processor coupled to the at least one memory device is additionally to:
compute the contactability metric responsive to assigning a weighting factor to at least one of the one or more signals.

16. The apparatus of claim 15, wherein the weighting factor is to comprise an increased value responsive to the at least one of the one or more signals indicating a relatively more recent event, and wherein the weighting factor is to comprise a decreased value responsive to the at least one of the one or more signals indicating a relatively less recent event.

17. The apparatus of claim 14, wherein the processor coupled to the at least one memory device is additionally to:
transmit a query to at least one database of the one or more databases, the query to request whether any person can be expected to respond to a telephone call; and
compute the contactability metric based, at least in part, on a response to the query.

18. The apparatus of claim 14, wherein the processor coupled to the at least one memory device is additionally to:
transmit a query to at least one database of the one or more databases, the query to indicate whether a predetermined individual can be expected to respond to a telephone call; and
compute the contactability metric based, at least in part, on a response to the query.

19. The apparatus of claim 18, wherein the at least one database comprises bureau and utility data and/or comprises a yellowbook type database.

20. The apparatus of claim 18, wherein the processor coupled to the at least one memory device is additionally to:
obtain a response to the query transmitted to the database of the one or more databases;
determine that the predetermined individual is not expected to respond to the telephone call; and
determine a parameter relating to an individual, different from the predetermined individual, that is expected to respond to the telephone call.

21. The apparatus of claim 14, wherein the processor coupled to the at least one memory device is additionally to:
compute a revised contactability metric of the communications device based, at least in part, on a linkage between two or more telephone numbers to correspond to the communications device.

22. The apparatus of claim 21, wherein the processor coupled to the at least one memory device is additionally to:
compute a fresh contactability metric for a linked telephone number based, at least in part, on the linkage between the two or more telephone numbers corresponding to the communications device.

23. An article comprising:
a non-transitory storage medium having instructions stored thereon executable by a special-purpose computing platform to:
obtain, via a communications network coupled to a client computing resource, signals indicative of a subscriber identifier;
compute a contactability metric of a communications device to correspond to the subscriber identifier, the contactability metric to relate to a likelihood that the communications device can be electronically contacted within a particular interval, the contactability metric to be computed responsive to one or more signals from one or more databases being made accessible to an authenticator, the one or more signals being indicative of a presence of one or more of the following signals to be obtained in response to:
determination of a type of the communications device;
determination of a line-disconnect of the communications device;
determination of whether the subscriber identifier to correspond to the communications device has been ported;
determination of an occurrence of at least one previous interaction between the authenticator and the communications device;
determination of a measure of activity of the communications device;
determination of whether an identification of a party accompanies an outgoing communication involving the communications device;
determination whether a multi-factor authentication occurred involving the communications device; and/or
determination of whether the communications device corresponds to a non-mobile device.

24. The article of claim 23, wherein the stored instructions executable by the special-purpose computing platform are additionally to:
compute the contactability metric responsive to assigning a weighting factor to at least one of the one or more signals, wherein
the weighting factor is to comprise an increased value responsive to the at least one of the one or more signals being indicative of a relatively more recent event, and wherein
the weighting factor is to comprise a decreased value responsive to the at least one of the one or more signals being indicative of a relatively less recent event.

25. The article of claim 23, wherein the stored instructions executable by the special-purpose computing platform are additionally to:
transmit a query to at least one database of the one or more databases, the query to request whether any person can be expected to respond to a telephone call; and
compute the contactability metric based, at least in part, on a response to the query.

26. The article of claim 23, wherein the stored instructions executable by the special-purpose computing platform are additionally to:
transmit a query to at least one database of the one or more databases, the query to represent whether a predetermined individual can be expected to respond to a telephone call; and
compute the contactability metric based, at least in part, on a response to the query.

27. The article of claim 26, wherein the at least one database comprises a database of bureau and utility data and/or comprises a yellowbook type database.

28. The article of claim 23, wherein the stored instructions executable by the special-purpose computing platform are additionally to:
- compute a revised contactability metric of the communications device based, at least in part, on a linkage between two or more telephone numbers to correspond to the communications device.

29. The article of claim 28, wherein the stored instructions executable by the special-purpose computing platform are additionally to:
- compute a fresh contactability metric for a linked telephone number based, at least in part, on the linkage between the two or more telephone numbers corresponding to the communications device.

* * * * *